UNITED STATES PATENT OFFICE 2,052,633

MANUFACTURE OF ARYLNAPHTHYLAMINES

Frederick H. Kranz, Buffalo, N. Y., assignor to National Aniline and Chemical Company, Inc., New York, N. Y., a corporation of New York No Drawing. Application November 22, 1933, Serial No. 699,135

5 Claims. (Cl. 260—128)

This application relates to the preparation of di(arylamino)-naphthalenes. It is especially directed to the production of 1,3-di(arylamino)-naphthalene-sulfonates from primary and secondary alphanaphthylamines containing a sulfonate group in meta-position to the amino group.

It is known that 1,3-di(arylamino)-naphthalene-sulfonates may be prepared by heating arylamines and arylamine hydrochlorides with 1,3-naphthylamine-sulfonates at temperatures above 150° C. The amino groups of the two compounds react to liberate ammonia and form an arylaminonaphthalene linkage. The amine or amine salt also reacts with the sulfonate group with the liberation of sulfur dioxide and water to form a second arylaminonaphthalene linkage. The reaction may be represented as follows:

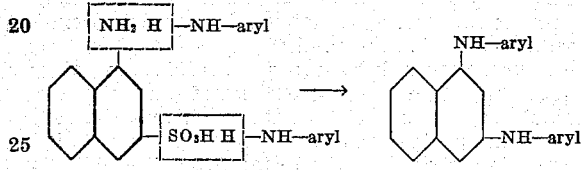

Prior to the present invention it has been supposed that the above high temperatures were essential for the reaction of the sulfonate group with the amine and that at lower temperatures the monoarylamino-naphthalene-sulfonate would be produced by reaction of the two amines, the sulfonate group being unaffected.

I have found that by maintaining suitable reaction conditions not only may the 1,3-di(arylamino)-naphthalenes be formed at temperatures lower than 150° C. but that a better yield and quality of product may be produced at the lower temperatures. In effecting the reaction at high temperatures tarry by-products are formed. These by-products not only reduce the yield of the desired product by causing a portion of the initial materials to be used up but are in themselves objectionable ingredients in that they adversely affect the color, purity, and solubility of the product and, since the product is largely employed as a dye intermediate, render resultant dyes and dyeings less perfect than otherwise obtainable unless in the purification of the product especial care is taken to remove these by-products.

In accordance with my invention a 1-aminonaphthalene-3-sulfonate or 1-arylaminonaphthalene-3-sulfonate is gradually added over a sufficiently extended period of time to a fluid mixture of a primary arylamine or arylamine salt, so that the reaction mixture is maintained substantially throughout the reaction period in a fluid condition. By operating in this manner, the agitation of the reaction mass is facilitated, maintenance of uniform temperature conditions throughout the reaction mass is made feasible, and a temperature not exceeding 135° C. is effective to produce a good yield of the product.

It may be noted further that when operating in the above manner, contrary to expectations, the higher temperatures formerly prescribed as essential, result in lower yields of the di(arylamino)-naphthalene. Below 135° C., on the other hand, the time required for treatment gradually increases as the temperature is diminished. Temperatures as low as 120° C., however, have been found to be satisfactory. In general reduction in temperature results in higher viscosity of the reaction mixture causing more difficult stirring. The employment of too low a temperature will be reflected in high power requirements and reduced uniformity and quality of the product.

In effecting the preparation of di(arylamino)-naphthalene-sulfonates in accordance with the present invention, it is desirable that a minimum amount of water be present and also it is desirable that the initial materials contain as little as possible of sodium chloride, preferably less than 1% by weight. This is more important when the sodium salts of the sulfonic acids are employed than when the sulfonic acids themselves are employed since in the former case sodium chloride will be formed as a product of the reaction and thus increase the sodium chloride content of the reaction mixture.

My invention is applicable in particular to the preparation of di(arylamino)-naphthalene-sulfonates from 1-amino-naphthalene-3,8-disulfonates by reaction with primary aromatic amines, or their salts,—e. g. the hydrohalides,—such as hydrochlorides, hydrobromides, and hydroiodides-, benzoates, and sulfates. These di(arylamino)-naphthalene-sulfonates may be represented by the following formula:

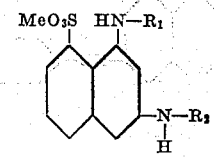

wherein $R_1$ and $R_2$ may be the same or different aryl radicals constituting the residue of an aromatic amine and containing or not containing further substituents; examples are the phenyl-, tolyl-, xylyl-, and naphthyl-radicals; and Me represents hydrogen or an alkali-metal.

The invention is similarly applicable to the preparation of diarylaminonaphthalenes generally from naphthalene-sulfonates containing the -NH- group in alpha-position and a sulfonate group in meta-position in respect thereto,—for example, the preparation of diarylaminonaphthalenes by reaction of primary aromatic amines or their salts upon 1-aminonaphthalene-3-monosulfonates or 1-arylaminonaphthalene-3-monosulfonates, and the preparation of diarylaminonaphthalene mono- and di-sulfonates by reaction of primary aromatic amines or their salts upon 1-arylaminonaphthalene-3,8-disulfonates, 1-aminonaphthalene-3,5-disulfonates, 1-arylaminonaphthalene-3,5-disulfonates, 1-aminonaphthalene-3,5,8-trisulfonates, and 1-arylaminonaphthalene-3,5,8-trisulfonates. In each case the sulfonate group in the -3- position is substituted by an arylamino-group, the other sulfonate groups, when present, remaining.

The following specific example is further illustrative of the invention herein described, the parts being by weight:

*Example.*—A mixture of 495 parts of aniline and 100 parts of hydrochloric acid, 20° Bé. (31%), is heated to a temperature of 130° C. at about atmospheric pressure, thereby distilling off a portion of the aniline and water present. The resultant hot mixture of aniline and aniline hydrochloride is fluid but possesses a low water content, that is 2 percent or less of water. To this fluid mixture there is added 7.5 parts of dry 1-aminonaphthalene-3,8-monosodium-disulfonate-dihydrate at about 15 minute intervals until 105 parts of the sulfonate has been added. In this manner, the fluid condition of the reaction mixture is retained throughout the reaction period, provided the temperature is maintained. The addition of the sulfonate requires about 3½ hours. During this addition, and for a period of 24 hours thereafter, the mixture is maintained at a temperature between 128° and 132° C. Lower temperatures may be employed for the fusion, in which case a longer fusion period should be employed; for example, at 120° C. the above reaction proceeds to completion in a fusion period of about 36 hours instead of 24 hours.

The purification or isolation may be effected in any well-known manner, for example, by adding the fusion mixture to an excess of hydrochloric acid, filtering off the precipitated compound in the form of free acid, washing the same with water, drying it, and treating the dry product with alcohol whereby, since the free acid is almost insoluble in alcohol, the soluble impurities are extracted.

A yield of about 90 parts of purified 1,3-di(arylamino)-naphthalene-8-sulfonic acid having the following probable formula is obtained:

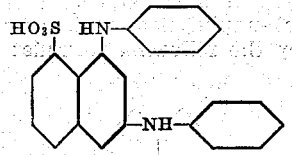

The product formed by the above process is obtained not only in larger yields but much freer from tarry by-products than that prepared by formerly known methods, containing only 0–2% impurities, and is therefore of better color and solubility. Furthermore, since these compounds are of particular application as dye intermediates, better dyes and dyeings are obtainable therewith.

I claim:

1. In the preparation of a di(arlyamino)-naphthalene, the method which comprises heating a mixture of a primary arylamine and an inorganic acid addition salt thereof to a temperature sufficient to maintain the mixture in a stirrable condition but not above 135° C. and gradually adding to the mixture, while maintaining the elevated temperature, a member of the group consisting of 1-aminonaphthalenes and 1-arylaminonaphthalenes, containing a sulfonate group in meta-position to the amino- or imino-group and regulating the addition thereof so as to maintain the reaction mixture in a fluid condition.

2. The method of preparing a 1,3-diarylaminonaphthalene-8-sulfonate, which comprises heating a mixture of an arylamine and its hydrochloride to an elevated temperature between 120 and 135° C. and gradually adding thereto, while maintaining the elevated temperature, a 1-naphthylamine-3,8-disulfonate, and continuing the heating until the reaction to the 1,3-diarylaminonaphthalene-8-sulfonate is substantially complete.

3. The method of preparing a 1,3-diarylaminonaphthalene-8-sulfonate, which comprises heating a mixture of aniline and aniline hydrochloride to a temperature of about 130° C., gradually adding thereto over a period of between three and four hours, while maintaining the elevated temperature, 1-naphthylamine-3,8-monosodium-disulfonate-dihydrate while agitating the mixture, the said reactants containing initially not more than 1 per cent of sodium chloride, regulating the addition of the naphthylamine so as to maintain the reaction mixture in a fluid condition throughout substantially the entire period, and continuing the heating at about 130° C. for an additional twenty-four hours.

4. In the preparation of a di(arylamino)-naphthalene by heating a primary arylamine or inorganic acid addition salt thereof with a sulfonate of the group consisting of 1-aminonaphthalenes and 1-arylaminonaphthalenes, containing a sulfonate group in meta-position to the amino- or imino-group, the improvement which comprises gradually adding the sulfonate to the primary arylamine or salt thereof, maintained at a temperature between 120° and 135° C.

5. In the preparation of a di(arylamino)-naphthalene by heating a primary arylamine hydrochloride with a sulfonate of the group consisting of 1-aminonaphthalenes and 1-arylaminonaphthalenes, containing a sulfonate group in meta-position to the amino- or imino-group, the improvement which comprises gradually adding the sulfonate to the primary arylamine hydrochloride, maintained at a temperature between 120° and 135° C.

FREDERICK H. KRANZ.